(12) United States Patent
Bakshi

(10) Patent No.: US 6,457,054 B1
(45) Date of Patent: Sep. 24, 2002

(54) SYSTEM FOR REDUCING USER-VISIBILITY LATENCY IN NETWORK TRANSACTIONS

(75) Inventor: Bikram Singh Bakshi, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/000,761

(22) Filed: Dec. 30, 1997

Related U.S. Application Data

(60) Provisional application No. 60/046,587, filed on May 15, 1997.

(51) Int. Cl.[7] .............................................. G06F 15/16
(52) U.S. Cl. ........................ 709/227; 709/232; 709/237
(58) Field of Search ................................. 709/237, 227, 709/232, 238

(56) References Cited

U.S. PATENT DOCUMENTS

| | | | |
|---|---|---|---|
| 5,373,375 A | 12/1994 | Weldy | 358/523 |
| 5,517,612 A | 5/1996 | Dwin et al. | 395/166 |
| 5,544,320 A | 8/1996 | Konrad | 395/200.09 |
| 5,673,322 A | 9/1997 | Pepe et al. | 380/49 |
| 5,684,969 A | 11/1997 | Ishida | 395/342 |
| 5,701,451 A | 12/1997 | Rogers et al. | 395/600 |
| 5,706,434 A | 1/1998 | Kremen et al. | 395/200.09 |
| 5,724,556 A | 3/1998 | Souder et al. | 395/500 |
| 5,727,159 A | 3/1998 | Kikinis | 395/200.76 |
| 5,742,905 A | 4/1998 | Pepe et al. | 455/461 |
| 5,768,510 A | 6/1998 | Gish | 395/200.33 |
| 5,805,735 A | 9/1998 | Chen et al. | 382/239 |

OTHER PUBLICATIONS

Mogul, Jeffrey C., "The Case for Persistent–Connection HTTP.", May 1995.*
RFC 1644, Braden R. T/TCP—TCP Extensions for Transactions Functional Specification, Jul. 1994.*
Armando Fox and Eric, A. Brewer, "Reducing WWW Latency and Bandwidth Requirements by Real–time Distillation," Fifth International World Wide Web Conference, May 6–10, 1996.
Armando Fox et al., Adapting to Network and Client Variability via On–Demand Dynamic Distillation, University of Cal. at Berkeley, Sep. 1996.

* cited by examiner

*Primary Examiner*—Glenton B. Burgess
*Assistant Examiner*—Kenneth W. Fields
(74) *Attorney, Agent, or Firm*—Kenyon & Kenyon

(57) ABSTRACT

A system for reducing user-visible latency for communications between two network devices is implemented in a method which includes transmitting a request packet from a first network device to a second network device, where the request packet has a request to establish a new connection and a request for data, with the request to establish a new connection including a connection identifier. The second network device selectively accepts the new connection or discards the request based upon a comparison of the connection identifier to a corresponding connection identifier that it maintains. The second network device transmits a response packet to the first network device that includes a confirmation of the request to establish a new connection and a reply to the request for data. A connection between the first and second network devices is maintained after receipt of the response packet.

25 Claims, 6 Drawing Sheets

CLIENT-SERVER PT-TCP
EXCHANGE FOR HTTP TRANSACTION

CLIENT-SERVER TCP
EXCHANGE FOR HTTP TRANSACTION

CLIENT-SERVER
P-HTTP EXCHANGE

CLIENT-SERVER T-TCP
EXCHANGE FOR HTTP TRANSACTION

SYSTEM FOR REDUCING USER-VISIBILITY LATENCY IN NETWORK TRANSACTIONS

This application claims the benefit of U.S. Provisional Application No. 60/046,587 titled "Method for Reducing User-Visible Latency in Network Transactions," filed May 15, 1997 by Bikram S. Bakshi and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for reducing user-visible latencies occurring during communications between network devices.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "web pages" on the World-Wide Web (WWW).

At the same time that the Internet's popularity has been growing, the trend in personal computer design has been towards increased portability. This trend is best evidenced by the rapid growth in popularity of so-called "notebook" or "laptop" computers. While PCs are becoming both more powerful and more portable, advances in communications infrastructure have not necessarily kept pace. A significant limitation on the ability of personal computers to exploit the Internet to full benefit is a lack of sufficient communications bandwidth. Similar problems may be caused by such conditions as high network traffic, even for high-speed Internet access lines. Such problems often translate into very long user-visible latencies when users interact with the Internet. Accordingly, one of the challenges faced by developers of hardware and software used for Internet communications has been to find ways to reduce user-visible latencies as much as possible.

One source of user-visible latency for Internet communications can be traced back to the communications protocols. Devices coupled to the Internet typically communicate with one another using HTTP (HyperText Transfer Protocol), which in turn makes use of the Transmission Control Protocol (TCP) as its transport protocol. TCP uses a three-way handshake procedure to establish a connection between, for example, a client device and a server device. Since a single HTTP transaction may involve transmission of a number of distinct data packets, possibly transmitted over different communications links, such handshaking may potentially introduce a significant amount of user-visible latency into any given transaction.

In view of the foregoing, efforts have been directed at improving the efficiency of HTTP communications. According to one such approach, known as "persistent HTTP" or P-HTTP, a persistent connection is established between a client device and a server device, thus limiting the overhead introduced by the TCP three-way handshake procedure to only a single occurrence at the beginning of the connection. This persistent connection may then be reused to retrieve, for example, all of the URLs (Uniform Resource Locators) associated with a requested HTML (HyperText Markup Language) document. In a variation on this approach, requests for multiple URLs may be pipelined within the same persistent connection, further improving communications efficiency. In an alternate approach, known as "transaction TCP" or TTCP, rather than reducing the number of handshakes that occur for any given request, the number of messages used to complete the handshake is reduced.

While both the P-HTTP and TTCP approaches help reduce user-visible latencies for HTTP communications, even greater improvements are possible through the use of communications protocols according to embodiments of the present invention.

SUMMARY OF THE INVENTION

According to an embodiment of the present invention, a method is provided for communications between two network devices. A first network device transmits a request packet to a second network device. The request packet includes a request to establish a connection and a request for data, wherein the request to establish a connection includes a connection identifier. The second network device compares the connection identifier to a corresponding connection identifier that it maintains, and selectively accepts a new connection or discards the request. The second network device transmits a response packet to the first network device which includes a confirmation of the request to establish a connection and a reply to the request for data. A connection is then maintained between the first and second network devices after receipt of the response packet.

DETAILED DESCRIPTION

Figure 1:
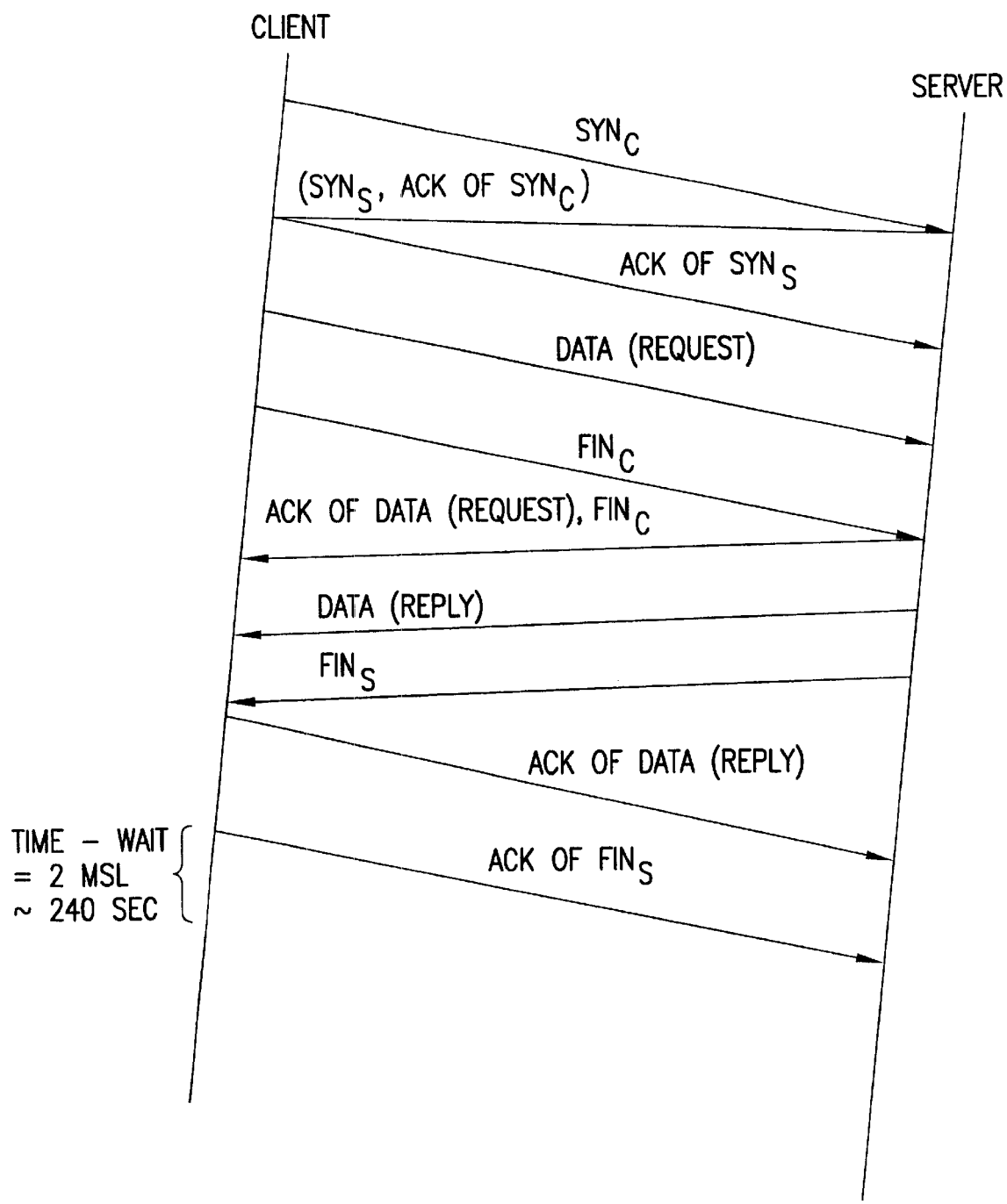
FIG. 1 is a timeline diagram of the handshake procedure that TCP uses to establish a standard HTTP connection between a client device and a server device.

Embodiments of the present invention are directed to reducing user-visible latencies for HTTP transactions between network devices, including client devices, proxies and server devices. Referring now to FIG. 1, in a typical HTTP transaction using TCP, a three-way handshake is performed to establish a connection (that is, open a socket) between an HTTP client device and server device. As illustrated, the client device transmits a synchronization signal ($SYN_c$) to the server device. The server device acknowledges the $SYN_c$ by transmitting a responsive synchronization signal ($SYN_s$) back to the client device. Upon receipt of the $SYN_s$, the client device transmits an acknowledgment signal (ACK), a data packet including, for example, a request for an HTML document, and a signal indicating the end of the transmission ($FIN_c$). The server device then transmits an ACK to acknowledge receipt of both the request and the $FIN_c$. After retrieving the requested data, the server device transmits a reply to the client device, followed by an end of transmission signal ($FIN_s$). In response, the client device transmits separate acknowledgments of both the reply and the $FIN_s$. This handshake procedure is performed for each exchange of data between the server device and the client device. Accordingly, the procedure may be performed several times in order to download an HTML document including references to multiple subordinate objects (identified, for example, by URLs), thereby magnifying the user-visible latency introduced by the procedure. The TCP handshake procedure is described more fully in 3 Richard Stevens & Addison Wesley, *TCP/IP Illustrated* 12–28 (1994).

One approach to reducing user-visible latency due to TCP handshaking is known as "persistent HTTP" (or P-HTTP). P-HTTP is described in Jeffrey Mogul, "Improving HTTP Latency" (1996) (available from Digital Equipment Corporation). This approach seeks to limit user-visible latency by performing the TCP handshake procedure only once, at the beginning of a data exchange, and then maintain a persistent connection for the duration of the exchange. Thus, to download a requested HTML document with multiple URLs, a client device would execute a handshake procedure to open a connection to the appropriate server device and then reuse that connection to request all of the URLs. In a variation of the P-HTTP approach, multiple requests for URLs may be pipelined within a persistent connection to further speed the transfer of content from the server to the client.

Figure 2:
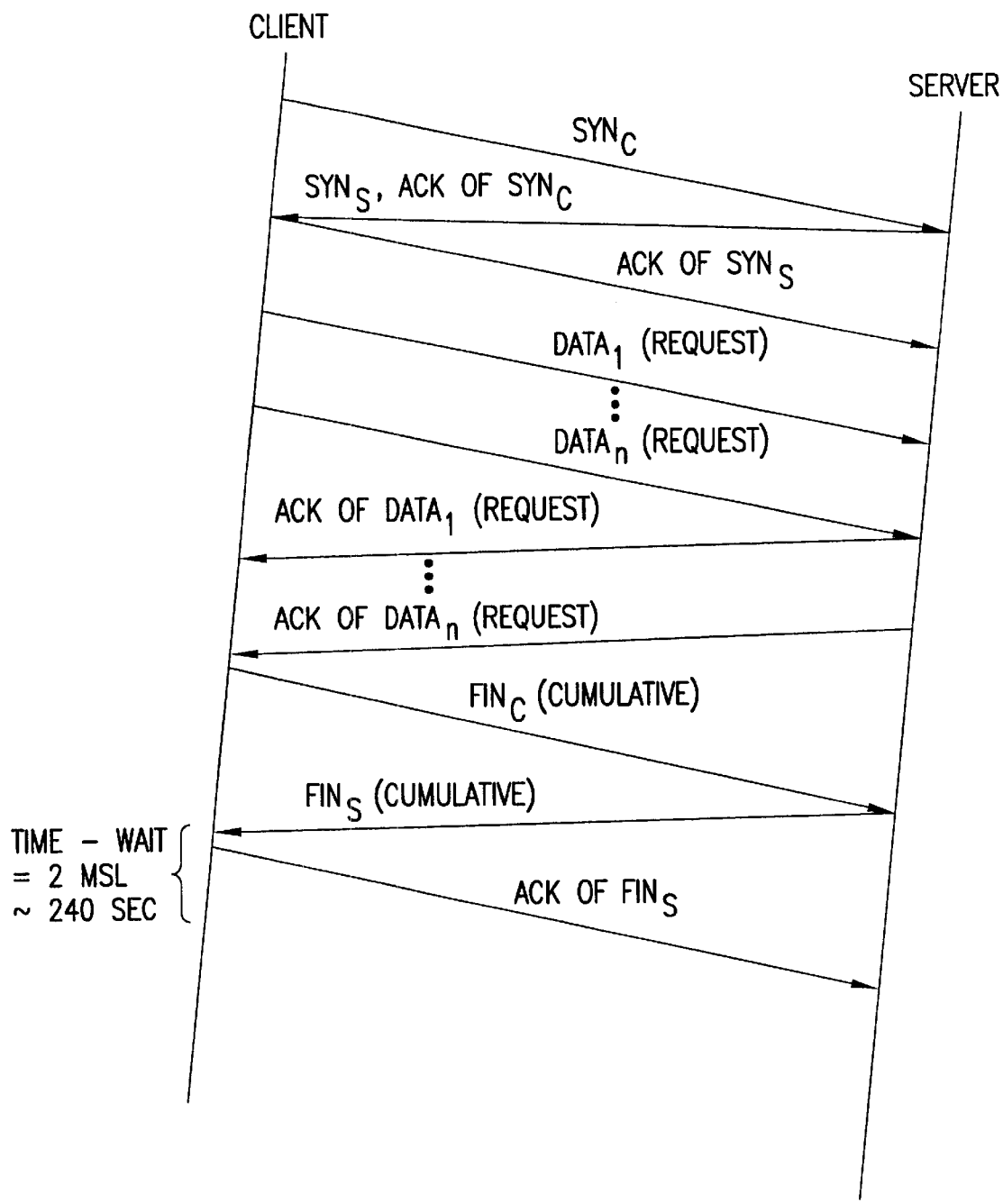
FIG. 2 is a timeline diagram of a transaction between a client device and a server device using P-HTTP.

FIG. 2 illustrates a data exchange using P-HTTP. The client device first transmits a $SYN_c$ to the server device, which the server device acknowledges by transmitting a $SYN_s$ back to the client device. Upon receipt of the $SYN_s$, the client device transmits an ACK, and then sequentially sends data packets separately requesting each of the URLs associated with the desired HTML document. The server device then transmits separate acknowledgments of each request, with each ACK signal respectively including the requested data. Once the client device has received replies to all of its requests, it transmits a single $FIN_c$, serving as a cumulative end of transmission signal. In response, the server device transmits a single $FIN_s$. Finally, the client device transmits an acknowledgment of the $FIN_s$ and the socket is closed.

Another approach to reducing user-visible latency due to TCP handshaking is known as "Transaction TCP" or TTCP. TTCP is also described in Stevens & Wesley, supra, at 12–28. This approach, illustrated in FIG. 3, seeks to reduce user-visible latency by reducing the number of messages used for the initial TCP handshake procedure. In addition, this approach seeks to reduce the amount of time that the client device stays in a TIME_WAIT condition when it initiates the process of terminating a connection (that is, an active close). The TIME_WAIT condition is generally used to ensure that the connection is reliably terminated, and to reduce the risk of duplicate or delayed data packets from introducing spurious error conditions. Both of these objectives are achieved by sending a "connection count" (CC) variable during the connection handshake and termination phases. The value of CC may be used by the server to identify a new request from any given client device. Reducing the extent of the TIME_WAIT condition has been found to increase the performance of devices running HTTP transactions, as it allows efficient reuse of network connection resources such as ports, transaction blocks (TCB), and protocol blocks (PB).

Figure 3:
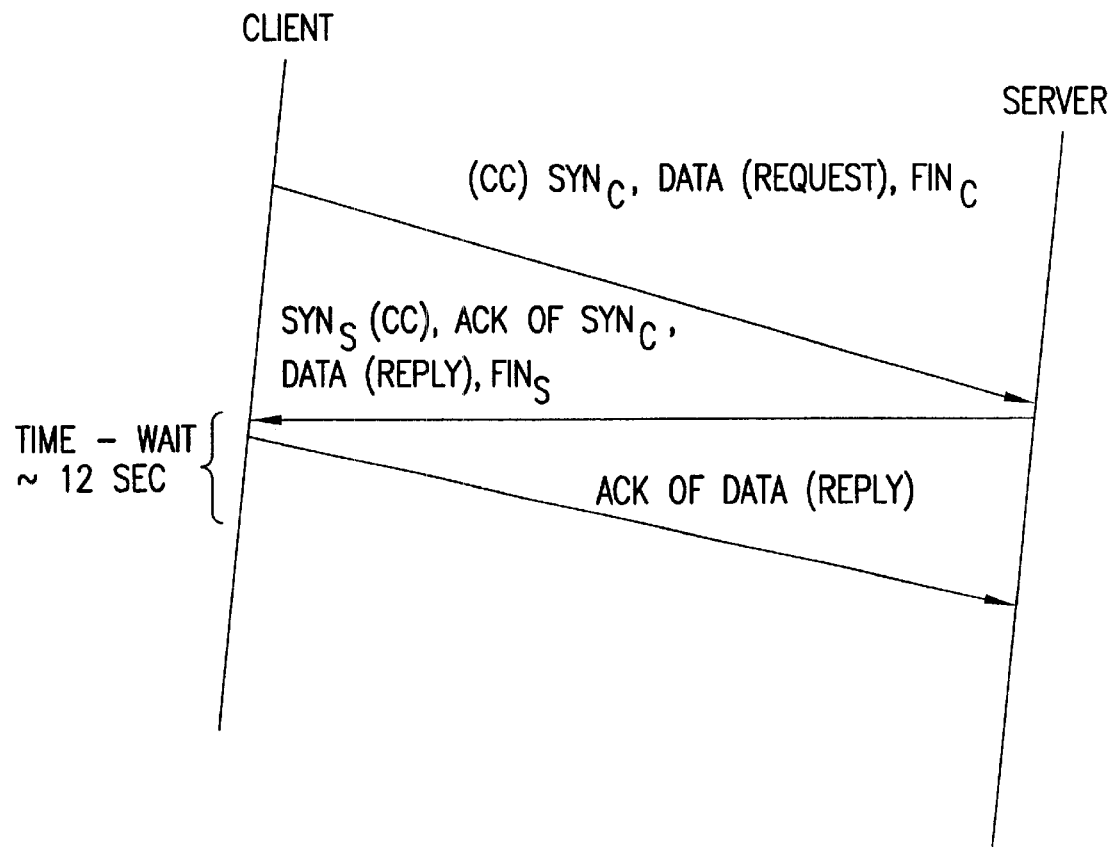
FIG. 3 is a timeline diagram of a transaction between a client device and a server device using TTCP.

Referring now to FIG. 3, according to the TTCP approach a client device initiates a connection to a server device by transmitting a $SYN_c$ including the CC variable, a request for data (such as an HTML document), and a $FIN_c$ indicating the end of the transmission, all in a single packet. In response, the server device transmits a $SYN_s$ (including the same CC variable), an acknowledgment of the $SYN_c$, the requested data, and a $FIN_s$ all in a single packet. The client device then transmits an acknowledgment of the reply. In view of the reduction in messages to accomplish the required TCP handshake, TTCP can reduce user-visible latency for a single TCP handshake procedure by a significant amount.

TTCP also provides a substantial reduction in the duration of the time-wait state associated with terminating the connection between a client device and a server device. Time-wait states are meant to ensure that the last transaction between a client device and a server device is completed before the connection is terminated. In a TCP exchange (see FIG. 1), this is usually signaled by receipt of an acknowledgment of a FIN segment by the network device that closed the connection (the $FIN_s$ in FIG. 1). A time-wait state is typically maintained for a period of time that would allow a network packet to traverse the distance from a source to a destination and back to the source. This time period is generally referred to in the art as the MSL (maximum segment lifetime) of a packet. For TTCP, the time-wait state is on the order of 12 seconds, compared to approximately 240 seconds for a TCP transaction.

According to embodiments of the present invention, an improved method for reducing user-visible latency in HTTP transactions adapts features of both P-HTTP and TTCP to increase the speed of HTTP transactions by a factor not possible using either approach independently. In a first embodiment, an enhanced protocol designated "persistent transactional TCP" (PT-TCP) involves both the use of a reduced number of messages during establishment of a connection and the use of a persistent (and optionally pipelined) connection. A timeline diagram for this embodiment is provided in FIG. 4.

Figure 4:
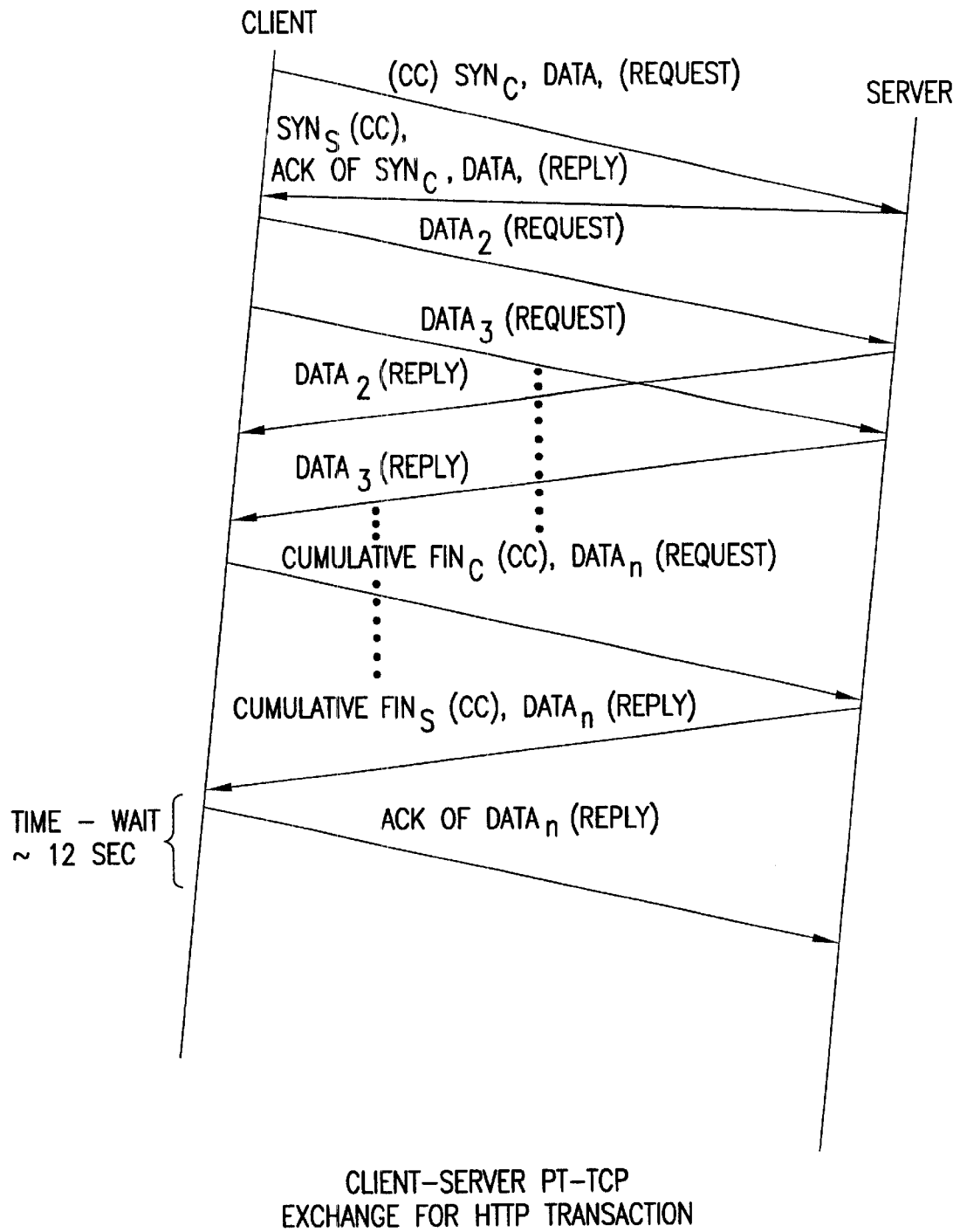
FIG. 4 is a timeline diagram of a transaction between a first network device and a second network device according to an embodiment of the present invention.

Referring to FIG. 4, the connection establishment phase between a client device and a server device uses only a single packet combining the $SYN_c$ and the data request, as compared to the three packets that TCP typically would use ($SYN_c$, ACK of $SYN_s$, and the data request). This reduction is accomplished by including a predetermined connection identifier, such as the connection count (CC) variable described above with reference to TTCP, in the $SYN_c$ packet. Upon receipt of the $SYN_c$ packet, the server device may compare the value of CC to a previous value maintained by the server for that particular client. If the value of CC is greater than the previous value for that client, the server device interprets the $SYN_c$ packet as a request for a new connection, in which case the new connection is accepted; otherwise, the packet is discarded as a duplicate. A monotonically increasing counter may be maintained by the client device to ensure that the value of CC generated for a given new connection is always greater than the value of CC for all prior connections. Whether the server device accepts a new connection or uses an established connection, the reply to the request from the client device may include all of the data requested or only a portion of that data, as is known in the art.

The connection establishment phase of the PT-TCP embodiment differs from the TTCP protocol described above in that the first packet sent by a client device lacks the $FIN_c$ signal used by TTCP to effectively instruct the server device to close the connection after serving the initial data request, thereby permitting the connection to be reused. Instead, a cumulative $FIN_c$ signal (and a corresponding $FIN_s$ signal) is used to drop the established connection only after all related data requests are serviced. The PT-TCP embodiment also differs from the P-HTTP protocol, which uses the same mechanism that standard TCP uses for its preliminary three-way handshake procedure. PT-TCP thus provides greater reductions in overhead for connection establishment than either TTCP or P-HTTP.

Still referring to the embodiment illustrated in FIG. 4, after a new request is received and serviced by the server device in the manner just described, the client device reuses the same connection to request all of the URLs contained in the HTML document returned by the server device ($Data_2$(request), $Data_3$(request), . . . $Data_n$(request)). This exchange of packets on an already-established connection may proceed similar to that described above for P-HTTP, thus providing still further reductions in user-visible latency. Once all of the referenced URLs are received ($Data_2$(reply), $Data_3$(reply), . . . $Data_n$(reply)), the client device may either choose to keep the connection open for future requests, or it may close the connection (for example, by sending a $FIN_c$ signal to the server device) to free system resources.

According to a variation of the embodiment shown in FIG. 4, the requests for referenced URLs from the client device to the server device may be pipelined to further reduce user-visible latencies. This may be accomplished by sending the additional requests ($Data_2$(request), $Data_3$(request), . . . $Data_n$(request)) either in rapid succession or as soon as the browser is able to generate them, rather than waiting for a reply to a particular request for sending the next request. Pipelining seeks to maximize use of the communications link by not allowing it to sit idle. In view of the foregoing, persons skilled in the art will appreciate that the term "connection" may refer to a pipelined connection or a non-pipelined connection. Moreover, the term "connection" may refer to a logical coupling, as opposed to a physical coupling, meaning the connection may actually consist of a plurality of communications lines or links. In any event, the present invention is not limited to any particular type or form of connection.

Figure 5:
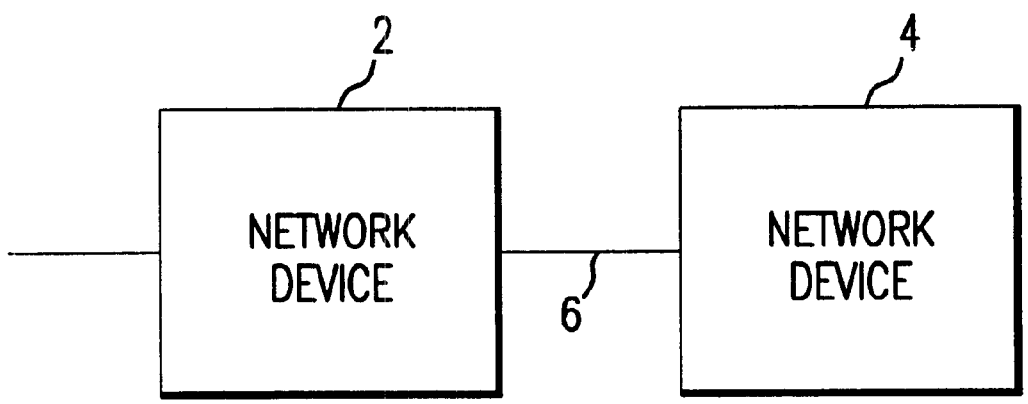
FIG. 5 is a schematic diagram illustrating a system to which embodiments of the present invention may be applied.
Figure 6:
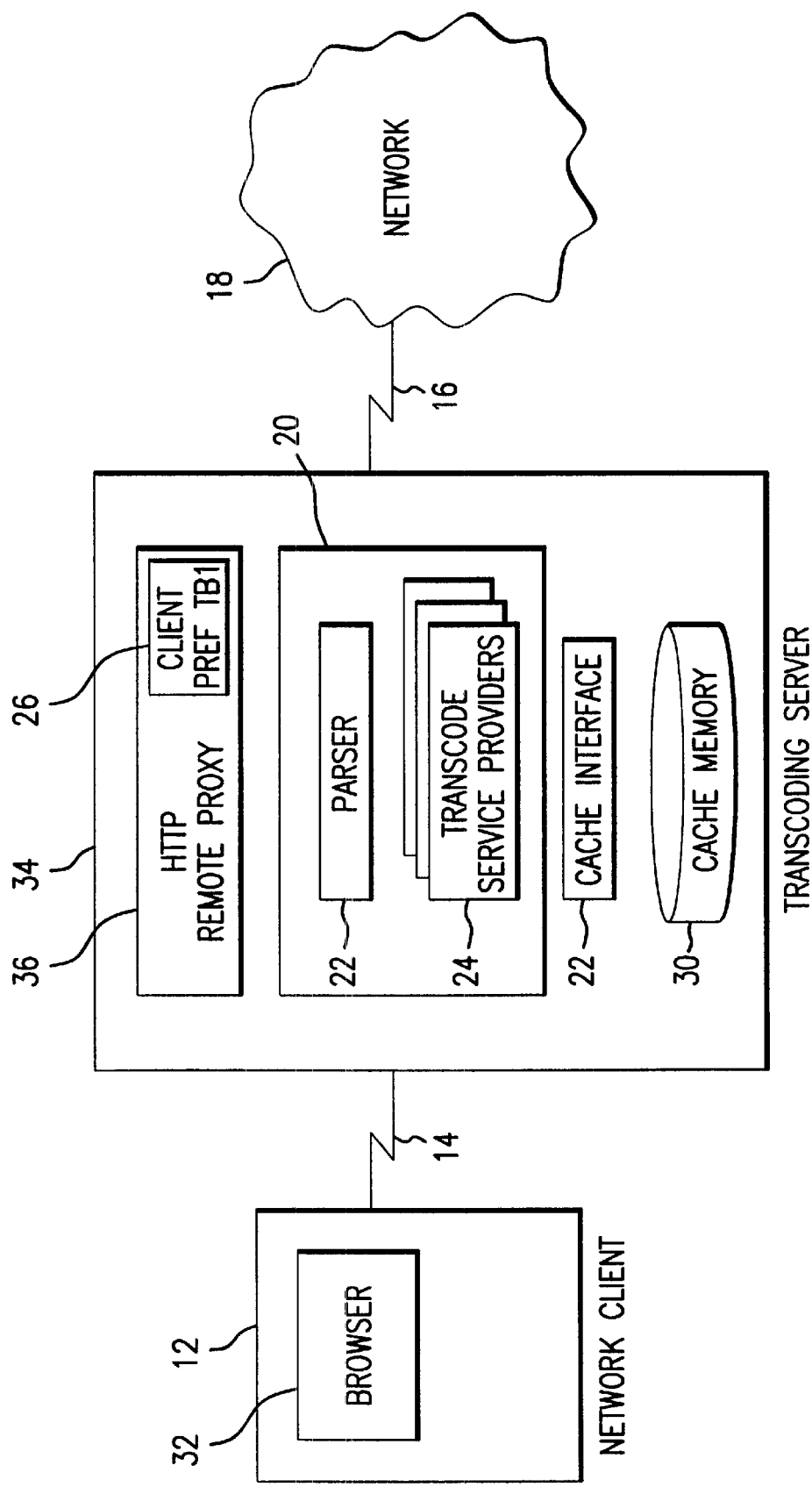
FIG. 6 is a schematic diagram illustrating a system for dynamically transcoding network data to which embodiments of the present invention may be applied.

By way of further illustration, the embodiment illustrated in FIG. 4 may be advantageously applied to a system such as that illustrated generally in FIG. 5. As shown, a first network device 2 is coupled to a second network device 4 by a communications link 6. First network device 2 and second network device 4 may comprise any network devices capable of communicating with one another according to a protocol such as that described with reference to FIG. 4. For example, as illustrated in FIG. 6, embodiments of the present invention may be applied to a system for dynamically transcoding network data. In this context, the term "transcode" refers to virtually any manipulation of data, including deletion, addition and modification. For example, one or more transcode service providers 24 may provide the capability to compress and/or scale different types of data content, such as image, video, or HTML. In that arrangement, first network device 2 corresponds to a network client 12 and second network device 4 corresponds to a transcoding server 34.

With reference to FIG. 6, a transcoding server 34 manages the transfer of data from a network 18 to network client 12. Network 18 may comprise, for example, the Internet. Network client 12, which may be any computer having suitable data communications capability, communicates requests for information to, and receives information from, transcoding server 34 over a client/server communications link 14.

Network client 12 includes a browser 32, such as the Netscape Navigator v.3.0 browser, which manages the presentation of data to a user. It should be noted, however, that network client 12 may alternatively use any suitable browser. Transcoding server 34 in turn communicates with computers resident on network 18 through server/network communications link 16. The respective communications links 14, 16 may comprise any suitable communications media known in the art.

Transcoding server 34 may comprise, or be a part of, a network server, a standalone computer in communication with a network server, or a distributed system of computers. Transcoding server 34 may be coupled, for example, to an ISP's network, a corporate network, or anywhere on network 18, and may provide multiple users (i.e., clients) with a means to obtain content on network 18. In this particular arrangement, transcoding server 34 includes a transcoder 20 having a parser 22 and a plurality of transcode service providers 24. Parser 22 is configured to act upon data received by transcoder 20, such as a request for a network object generated by client device 12 or a reply to such a request provided by a content server device on network 18. Here, parser 22 is responsible for selectively invoking one or more of transcode service providers 24 based upon a predetermined selection criterion.

Transcoding server 34 includes an HTTP remote proxy 36, capable of accessing network 18 over server/network communications link 16. HTTP remote proxy 36 differs from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12, as is explained further below. The functionality described above with reference to embodiments of the present invention may be implemented, for example, in HTTP remote proxy 36.

Transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion.

Transcoding server 34 may also include a server-side cache memory 30 managed by a server-side cache interface 28. Server-side cache memory 30 may be used to store both original and transcoded versions of content for later transmission to network client 12 without re-retrieving the content from Internet 18 or re-transcoding the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular embodiment, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this embodiment is through parser 22.

For purposes of illustrating possible interactions between the devices illustrated in FIG. 6, in one embodiment server-side cache interface 28 may include the following calls:

CreateEntry(URL, &Entry, . . . );
GetEntry(URL, &Entry);
CreateStream(Entry, &StreamEntry, . . . );
GetStream(Entry, &StreamEntry, . . . );
CloseEntry(Entry);
CloseStreamEntry(StreamEntry);

GetProperties(Entry, &Properties, . . . );
SetProperties(Entry, &Properties, . . . );
Read(StreamEntry, &OutStream, . . . );
Write(StreamEntry, &InStream, . . . ).

Unlike most cache memories, server-side cache interface 28 and server-side cache memory 30 enable maintenance of multiple representations of a given cached object, with descriptive information about each representation included in server-side cache memory 30. In addition, server-side cache interface 28 and server-side cache memory 30 serve as a synchronization point for multi-threaded accesses to cached objects.

The CreateEntry( ) call creates and returns a cache entry for a specified hypertext object. This call also creates an entry stream for an original version of the hypertext object. Similarly, the GetEntry( ) call obtains a cache entry for a hypertext object already existing in cache memory 30. Both the CreateEntry( ) and GetEntry( ) calls set locks on associated cached objects until a CloseEntry( ) call is invoked. Once a lock is set, the cached object will not be replaced or invalidated by cache interface 28, permitting one or more transcode service providers 24 to safely perform cache operations, such as object retrieval and/or storage.

After a cache entry is created or opened by a CreateEntry( ) or GetEntry( ) call, the CreateStream( ) or GetStream( ) calls may respectively create or open an extra stream entry for the cached object. Each extra stream entry is associated with a different transcoded version of the hypertext object, which may be retrieved or appended to by one of transcode service providers 24. Stream-based processing of cached objects makes it possible for transcoding server 34 to begin transmitting a transcoded version of a hypertext object to a requesting network client 12 even while transcode service provider 24 is appending additional transcoded content to that same version. Advantages of this stream-based processing include reducing user latency through incremental painting of objects and avoiding unnecessary idle time on client/server communications link 14, thereby providing users with a more responsive "feel."

The GetProperties( ) and SetProperties( ) calls retrieve and store information about cached objects, including information maintained by transcode service provider 24 used to determine transcoding properties and transcoding status of a cached object. Transcode service provider 24 may use such information, for example, to determine current compression progress for scaled data access and staged refinements.

The Read( ) call reads data from a specified cached object data stream. For example, transcode service provider 24 may invoke this call and tunnel stream data through HTTP remote proxy 36 directly to network client 12. The Write( ) call caches data from a new HTTP data stream. This call will append an incoming data stream received from, for example, a Web server or transcode service provider 24, to an opened cache stream which may be concurrently read using the Read( ) call.

In the arrangement of FIG. 6, parser 22 may include the following calls:

GetObject(URL, InParams, &OutParams, &OutStream, . . . );
GetScaledObject(URL, InParams, &OutParams, &OutStream, Stage, . . . );
PutObject(URL, InParamStruct, &InStream, &OutParams, &OutStream, . . . ).

As detailed below, parser 22 uses these calls to manage the provision of requested content to network client 12.

The GetObject( ) call is used to service non-enabled client requests, and returns a non-transcoded (i.e., original) version of a specified hypertext object. In this embodiment, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 may use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In accordance with the foregoing description, in one embodiment, when network client 12 requests a hypertext object, HTTP remote proxy 36 may use either the GetObject( ) or GetScaledObject( ) call (depending on if network client 12 is capable of receiving scaled/transcoded datatypes) to retrieve the hypertext object from parser 22. If the hypertext object is not found, parser 22 may, in this embodiment, use the CreateEntry( ) call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

The foregoing description with reference to FIG. 6 was presented merely to illustrate an example of the type of system to which embodiments of the present invention may be advantageously applied. As noted above, embodiments of the present invention may be applied in a wide variety of devices. Moreover, although the present invention was described largely with reference to systems for accessing data from the Internet, persons skilled in the art will recognize that it is also applicable to other networking environments. For example, embodiments of the present invention may be used to enhance data communications between a network client computer and an "intranet" (a secure corporate network modeled after the Internet architecture), and generally includes mechanisms for communicating with external networks such as the Internet.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

The foregoing is a detailed description of particular embodiments of the present invention. The invention embraces all alternatives, modifications and variations that fall within the letter and spirit of the claims, as well as all equivalents of the claimed subject matter. For example, embodiments of the present invention may be applied to communications protocols other than TCP. Moreover, although embodiments were described herein principally in terms of communications between a client device and a server device, the same or similar embodiments may be readily applied to improve communications between other types of network devices (for example, client/client, client/proxy, proxy/server, client/server). Persons skilled in the art will recognize from the foregoing detailed description that many other alternatives, modifications and variations are possible.

What is claimed is:

1. A method for communications between two network devices, said method comprising the steps of:

transmitting a first request packet from a first network device to a second network device, the first request packet consisting of a request to establish a new connection and a request for data, the request to establish a new connection including a new connection identifier;

selectively accepting the new connection or discarding the request based upon a comparison of the new connection identifier to a current connection identifier maintained by the second network device;

transmitting a first response packet from the second network device to the first network device, the first response packet comprising a confirmation of the request to establish a new connection and a reply to the request for data; and maintaining a connection between the first and second network devices after receipt of the first response packet and using the maintained connection for transmission of one or more additional request packets associated with the first request packet and one or more corresponding response packets, wherein a last one of the additional request packets includes an instruction to drop the maintained connection, said instruction specifying the new connection identifier, and a corresponding last one of the additional response packets includes a confirmation of said instruction.

2. The method of claim 1, further comprising the steps of:

transmitting a second request packet from the first network device to the second network device using the maintained connection, the second request packet comprising a second request for data; and transmitting a second response packet from the second network device to the first network device using the maintained connection, the second response packet comprising a reply to the second request for data.

3. The method of claim 2, wherein each of the second request packet and the second response packet further comprises an end of transmission signal, said method further comprising the step of terminating the maintained connection following receipt of the second response packet by the first network device.

4. The method of claim 3, wherein said step of terminating the maintained connection comprises transmitting a signal from the first network device to the second network device acknowledging receipt of the end of transmission signal.

5. The method of claim 1, further comprising the steps of:

transmitting a plurality of additional request packets from the first network device to the second network device in a pipelined manner using the maintained connection, wherein each of the additional request packets comprises a request for data; and transmitting a plurality of response packets from the second network device to the first network device in a pipelined manner using the maintained connection, wherein each of the additional response packets comprises a reply to a corresponding one of the plurality of additional requests for data.

6. The method of claim 1, wherein said step of transmitting a response packet further comprises returning all of the data requested by the first network device.

7. The method of claim 1, wherein said step of transmitting a response packet further comprises returning a portion of the data requested by the first network device.

8. The method of claim 1, wherein said step of transmitting a request packet further comprises transmitting a connection identifier corresponding to a plurality of communications lines.

9. The method of claim 1, wherein said step of transmitting a request packet further comprises transmitting a connection identifier corresponding to a pipelined connection.

10. The method of claim 1, wherein said step of transmitting a request packet further comprises transmitting a connection identifier corresponding to a non-pipelined connection.

11. A storage medium containing a set of instructions for execution by a first network device capable of communicating with a second network device, said set of instructions comprising instructions for:

transmitting a first request packet from a first network device to a second network device, the first request packet consisting of a request to establish a new connection and a request for data, the request to establish a new connection including a new connection identifier;

selectively accepting the new connection or discarding the request based upon a comparison of the new connection identifier to a current connection identifier maintained by the second network device;

transmitting a first response packet from the second network device to the first network device, the first response packet comprising a confirmation of the request to establish a new connection and a reply to the request for data; and maintaining a connection between the first and second network devices after receipt of the first response packet and using the maintained connection for transmission of one or more additional request packets associated with the first request packet and one or more corresponding response packets, wherein a last one of the additional request packets includes an instruction to drop the maintained connection, said instruction specifying the new connection identifier, and a corresponding last one of the additional response packets includes a confirmation of said instruction.

12. The storage medium of claim 11, wherein the set of instructions further comprises instructions for:

transmitting a second request packet to the second network device using the maintained connection, the second request packet comprising a second request for data; and receiving a second response packet from the second network device using the maintained connection, the second response packet comprising a reply to the second request for data.

13. The storage medium of claim 12, wherein each of the second request packet and the second response packet further comprises an end of transmission signal, said set of instructions further comprising instructions for terminating the maintained connection following receipt of the second response packet.

14. The storage medium of claim 13, wherein said instructions for terminating the maintained connection comprise instructions for transmitting a signal to the second network device acknowledging receipt of the end of transmission signal.

15. The storage medium of claim 11, wherein the set of instructions further comprises instructions for:

transmitting a plurality of additional request packets to the second network device in a pipelined manner using the maintained connection, wherein each of the additional request packets comprises a request for data; and receiving a plurality of response packets from the second network device in a pipelined manner using the maintained connection, wherein each of the additional response packets comprises a reply to a corresponding one of the plurality of additional requests for data.

16. The storage medium of claim 11, wherein the first network device comprises a client device.

17. The storage medium of claim 16, wherein the second network device comprises a proxy.

18. The storage medium of claim 17, wherein the second network device comprises a server device.

19. A storage medium containing a set of instructions for execution by a first network device capable of communicating with a second network device, said set of instructions comprising instructions for:

receiving a first request packet from the second network device, the first request packet consisting of a request to establish a new connection and a request for data, the request to establish a new connection including a new connection identifier;

selectively accepting the new connection or discarding the request based upon a comparison of the new connection identifier to a current connection identifier maintained by the first network device;

transmitting a first response packet to the second network device, the first response packet comprising a confirmation of the request to establish a new connection and a reply to the request for data; and maintaining a connection between the first and second network devices after transmission of the first response packet and using the maintained connection for transmission of one or more additional request packets associated with the first request packet and one or more corresponding response packets, wherein a last one of the additional request packets includes an instruction to drop the maintained connection, said instruction specifying the new connection identifier, and a corresponding last one of the additional response packets includes a confirmation of said instruction.

20. The storage medium of claim 19, wherein the set of instructions further comprises instructions for:

receiving a second request packet from the second network device using the maintained connection, the second request packet comprising a second request for data; and transmitting a second response packet to the second network device using the maintained connection, the second response packet comprising a reply to the second request for data.

21. The storage medium of claim 20, wherein each of the second request packet and the second response packet further comprises an end of transmission signal, said set of instructions further comprising instructions for terminating the maintained connection following transmission of the second response packet.

22. The storage medium of claim 21, wherein said instructions for terminating the maintained connection further comprise instructions for terminating the maintained connection following receipt of a signal from the second network device acknowledging receipt of the end of transmission signal.

23. The storage medium of claim 19, further comprising instructions for:

receiving a plurality of additional request packets from the second network device in a pipelined manner using the maintained connection, wherein each of the additional request packets comprises a request for data; and transmitting a plurality of response packets to the second network device in a pipelined manner using the maintained connection, wherein each of the additional response packets comprises a reply to a corresponding one of the plurality of additional requests for data.

24. A method for providing data to a requesting device, wherein the data to be provided consists of a plurality of data objects, said method comprising the steps of:

(a) receiving a first request packet from a requesting device, the first request packet consisting of a first synchronization signal and a request for a first data object, the first synchronization signal including a new connection identifier;

(b) establishing a connection with the requesting device if the new connection identifier does not match an identifier for an existing connection;

(c) transmitting a first response packet to the requesting device over the established connection, the first response packet consisting of a second synchronization signal, an acknowledgment of the first synchronization signal, and the first data object;

(d) receiving a second request packet from the requesting device over the established connection, the second request packet consisting of a request for a second data object;

(e) transmitting a second response packet to the requesting device over the established connection, the second response packet consisting of the second data object;

(f) repeating steps (d) and (e) for all but a last of the plurality of data objects in the data to be transmitted;

(g) receiving a final request packet from the requesting device over the established connection, the final request packet consisting of an instruction to terminate the established connection and a request for the last data object, said instruction specifying the new connection identifier;

(h) transmitting a final response packet to the requesting device over the established connection, the final response packet consisting of a confirmation of the instruction to terminate the established connection and the last data object; and (i) receiving an acknowledgment that the last data object was received by the requesting device and terminating the established connection in response thereto.

25. The method of claim 24, wherein said requesting device comprises a client.

* * * * *